United States Patent [19]

Imao et al.

[11] Patent Number: 4,944,023
[45] Date of Patent: Jul. 24, 1990

[54] METHOD OF DESCRIBING IMAGE INFORMATION

[75] Inventors: Kaoru Imao, Yokohama; Hideyuki Watanabe, Kawasaki, both of Japan

[73] Assignee: Ricoh Company, Ltd., Japan

[21] Appl. No.: 195,266

[22] Filed: May 18, 1988

[30] Foreign Application Priority Data

| May 19, 1987 | [JP] | Japan | 62-120027 |
| May 19, 1987 | [JP] | Japan | 62-120028 |
| May 20, 1987 | [JP] | Japan | 62-121080 |
| May 25, 1987 | [JP] | Japan | 62-125976 |

[51] Int. Cl.$^5$ .................................................. G06K 9/00
[52] U.S. Cl. .................................. 382/37; 382/21; 382/56; 358/108
[58] Field of Search .................. 382/37, 56, 21, 39, 382/38; 358/135, 108

[56] References Cited

U.S. PATENT DOCUMENTS

| 4,597,101 | 6/1986 | Kishimoto et al. | 382/21 |
| 4,692,806 | 9/1987 | Anderson et al. | 358/108 |
| 4,783,841 | 11/1988 | Crayson | 382/37 |
| 4,831,659 | 5/1989 | Miyaoka et al. | 382/56 |

OTHER PUBLICATIONS

Hanan Samet, "The Quadtree and Related Hierarchical Data Structures", Computing Surveys, vol. 16, No. 2, Jun. 1984.

Primary Examiner—Leo H. Boudreau
Assistant Examiner—Yon Jung
Attorney, Agent, or Firm—Mason, Fenwick Lawrence

[57] ABSTRACT

A method of describing an image made up of a plurality of kinds of regions in an n-dimensional space by a tree structure, comprises the steps of recursively and equally dividing the image into $2^n$ regions until each region includes two or less kinds of regions, thereby making a first level of the tree structure, and recursively and equally subdividing each of the $2^n$ regions into $2^n$ subregions until each subregion includes only one kind of region and for describing only one of two kinds of regions by a tree structure in which each parent node which degree is one and only having one branch is integrated into a filial node thereof, thereby making a second level of the tree structure. Each filial node in the second level of the tree structure is added with first division information described by sequential data of $2^n$ kinds of codes corresponding to position information of each filial node with respect to a parent node thereof, and each leaf in the second level of the tree structure is added with second division information describing at least a least significant code of the first division information by $2^n$ or more kinds of codes which are pattern information of each leaf with respect to a parent node thereof.

16 Claims, 21 Drawing Sheets

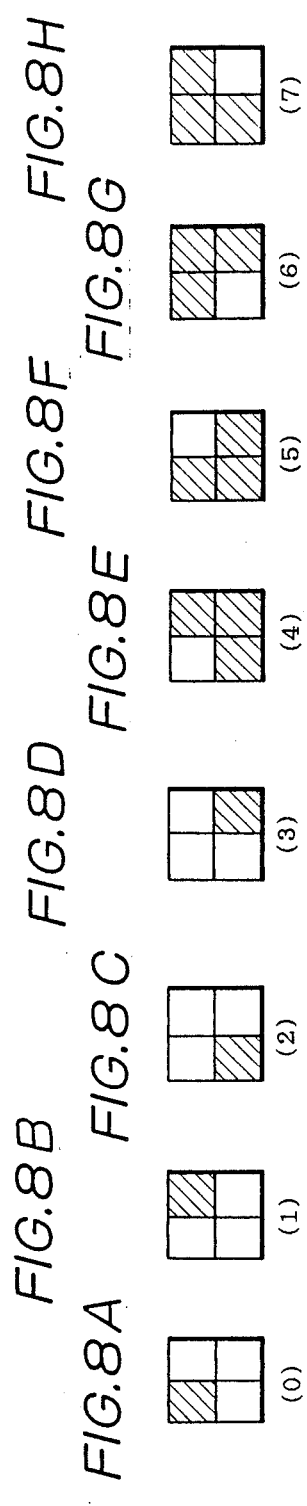
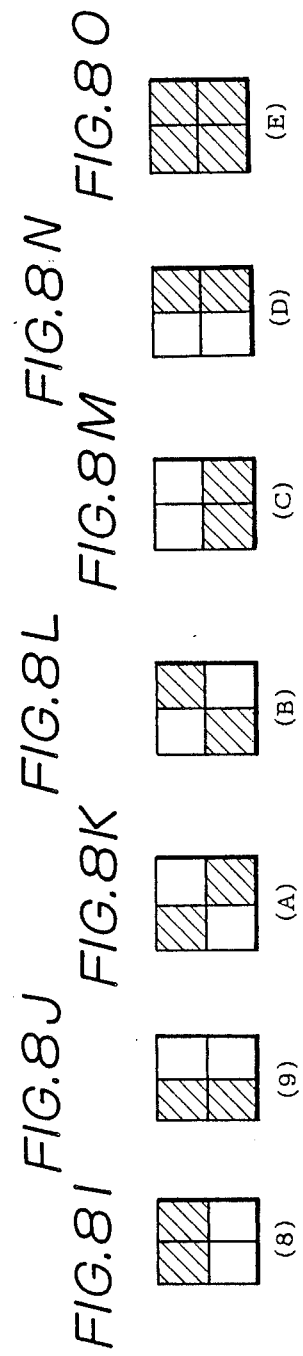

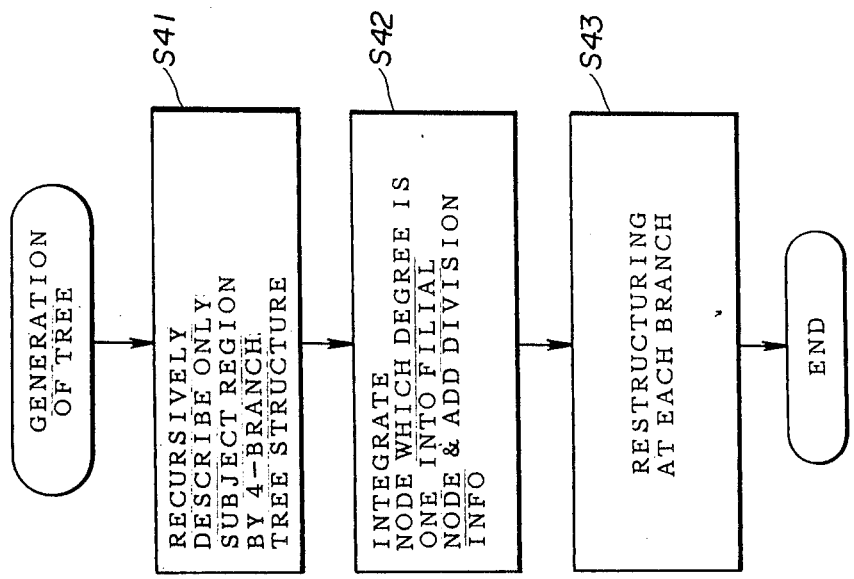
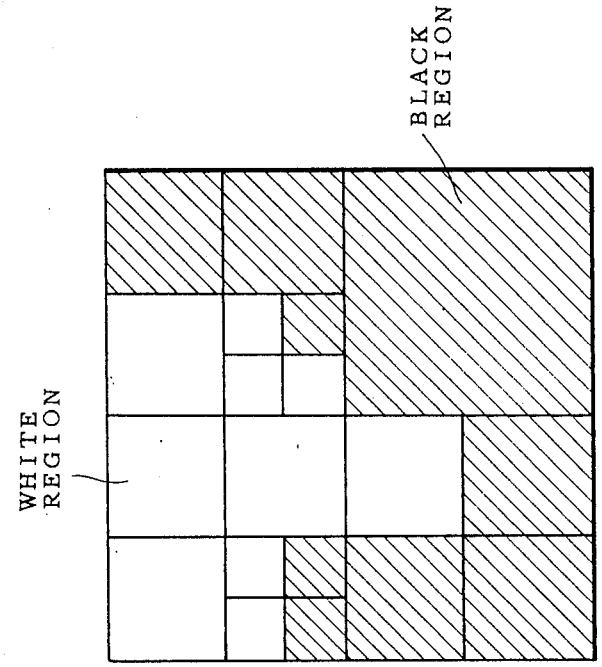

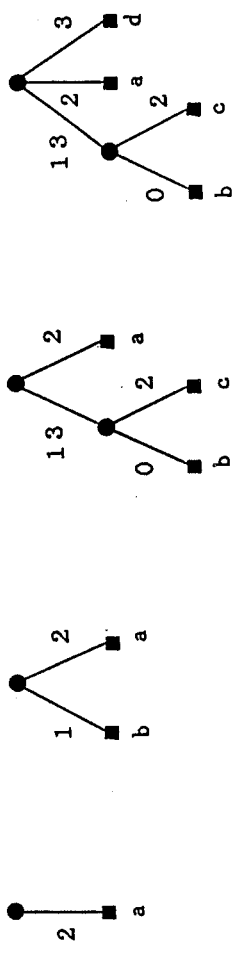
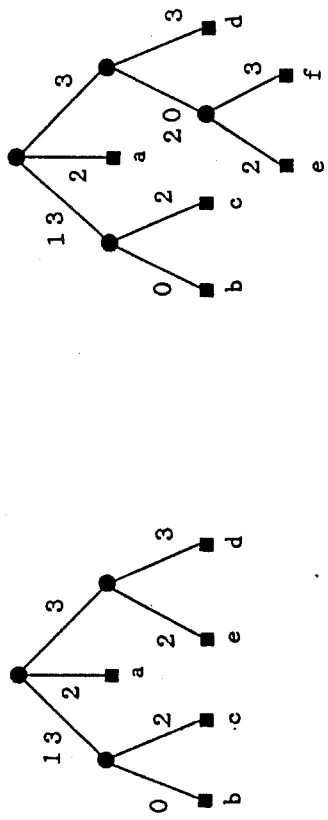
FIG.24A  FIG.24B  FIG.24C  FIG.24D  FIG.24E  FIG.24F

METHOD OF DESCRIBING IMAGE INFORMATION

BACKGROUND OF THE INVENTION

The present invention generally relates to methods of describing an image, and more particularly to a method of describing an image by a tree structure and applicable to image retrieval, image recognition, image encoding, image transmission, clustering and the like.

Conventionally, as a hierarchical data structure for describing an image, there is a method of describing an image showing in FIG. 1 made up of a plurality of kinds of regions A, B, C, D and E by a four-branch tree structure (so-called guadtree) shown in FIG. 2, for example. According to this system, the image is equally divided (decomposed) into four regions, and each region is recursively and equally subdivided (decomposed) into four subregions until each subregion is made up solely of a single kind of region. The image data storage efficiency of this method is satisfactory, and the method enables basic image processing in the data structure. In addition, the image can be described in levels of rough steps to fine steps. However, as shown in FIG. 2, there is a problem in that a number of nodes increases especially at boundary portions of the data structure. In the four-branch tree structure shown in FIG. 2, three nodes and a leaf branch out from a root node. The node is indicated by a circular mark and corresponds to the region or subregion made up of two or more kinds of regions. On the other hand, the leaf is indicated by a black circular mark and corresponds to the region or subregion made up solely of a single kind of region,.

A method of describing the image by a tree structure having two levels was proposed in "A System of Describing Region Information by a Two-Level Tree Structure" by Osawa et al, Denshi Tsushin Gakkai Ronbunshi, '84/10 Vol. J67-D No.10. According to this proposed method, the tree structure is divded into two levels, and the general information is described by a two-brancah tree structure in a first level while the detail information is described by a simplified two-branch tree structure in a second level. Compared to the conventional method using the four-branch tree structure, the number of nodes is reduced according to this proposed method. However, since the proposed method is based on the two-branch tree structure, there is a problem in that a number of intermediate nodes which are neither a root node nor leaf increases.

SUMMARY OF THE INVENTION

Accordingly, it is a general object of the present invention to provide a novel and useful method of describing an image by a tree structure in which the problems described heretofore are eliminated.

Another and more specific object of the present invention is to provide a method of describing an image made up of a plurality of kinds of regions in an n-dimensional space by a tree structure, comprising a first step of recursively and equally dividing the image in the n-dimensional space into $2^n$ regions until each of the $2^n$ regions include two or less kinds of regions, thereby making a first level of the tree structure having a root node corresponding to the image in its entirety, L nodes connected to the root node and each corresponding to a region with three or more kinds of regions and M leaves connected to the root node or a node and each corresponding to a region with two or less kinds of regions, where $L=0, 1, 2, ..., n$, $M=1, 2, 3, ..., n$, $L+M=n$, and each of the nodes have branches branching out therefrom and connecting to a filial node or leaf thereof, and a second step of recursively and equally subdividing each of the $2^n$ regions in the n-dimensional space into $2^n$ subregions until each subregion includes only one kind of region and for describing only one of two kinds of regions by a tree structure in which each node which degree is one and only having one branch is integrated into a filial node or leaf thereof, thereby making a second level of the tree structure, where each node in the second level of the tree structure is added with first division information described by sequential data of $2^n$ kinds of codes corresponding to position information of each node with respect to a parent node thereof, each leaf in the second level of the tree structure is added with second division information describing at least a least significant code of the first division information by $2^n$ or more kinds of codes which are pattern information of each leaf with respect to a parent node thereof, and the tree structure describes the image in the first and second levels thereof. According to the method of the present invention, it is possible to describe the image by the two-level tree structure having a small number of nodes because the first level of the tree structure describes the general information and the second level of the tree structure describes the detail information. It is also possible to reduce the number of leaves by encoding the leaves. As a result, it is possible to greatly compress the data on the image, and the retrieval can be carried out efficiently based on the division information.

Still another object of the present invention is to provide a method of describing an image made up of two kinds of regions in an n-dimensional space by a tree structure, comprises the steps of recursively and equally dividing the image in the n-dimensional space into $2^n$ regions until each region includes only one kind of region and for describing only one of the two kinds of regions by a tree structure having a root node corresponding to the image in its entirety, L nodes connected to the root node and each corresponding to a region with two kinds of regions and M leaves connected to the root node or node and each corresponding to a region with one kind of region, where $L=0, 1, 2, ..., n$, $M=1, 2, 3, ..., n$, $L+M=n$, and each of the nodes have branches branching out therefrom and connecting to a filial node or leaf thereof, integrating out of the nodes a node which degree is one and only having one branch into a filial node thereof, and adding to each of the nodes and leaves division information decribed by sequential data of $2^n$ kinds of codes corresponding to position information with respect to a parent node thereof.

A further object of the present invention is to provide a method of describing an image made up of two kinds of regions in an n-dimensional space by a tree structure, comprising the steps of recursively and equally dividing the image in the n-dimensional space into $2^n$ regions until each region includes only one kind of region and for describing only one of the two kinds of regions by a tree structure having a root node corresponding to the image in its entirety, L nodes connected to the root node and each corresponding to a region with two kinds of regions and M leaves connected to the root node or node and each corresponding to a region with one kind of region, where $L=0, 1, 2, ..., n$, $M=1, 2, 3, ..., n$, $L+M=n$, and each of the nodes have branches branching out therefrom and connecting to a filial node or leaf thereof, integrating out of the nodes a node which degree is one and only having one branch into a filial node thereof, adding to each node which degree is one and remaining leaves first division information described by sequential data of $2^n$ kinds of codes corresponding to position information with respect to a parent node thereof, and adding to each of the leaves second division information corresponding to a least significant code of the first division information and described by $2^n$ or more kinds of codes which are pattern information with respect to a parent node thereof so as to integrate leaves connected to a common parent node.

Another object of the present invention is to provide a method of describing an image including point information in an n-dimensional space by a tree structure, comprising the steps of recursively and equally dividing the image in the n-dimensional space into $2^n$ regions until each region includes a maximum of one point information and for describing only those regions including point information by a tree structure having a root node corresponding to the image in its entirety, L nodes connected to the root node and each corresponding to a region with two kinds of regions and M leaves connected to the root node or node and each corresponding to a region with one kind of region, where L=0, 1, 2, ..., n, M=1, 2, 3, ..., n, L+M=n, and each of the nodes have branches branching out therefrom and connecting to a filial node or leaf thereof, integrating a node which degree is one and only having one branching into a filial node thereof, and adding to each of the nodes and leaves division information described by sequential data of $2^n$ kinds of codes corresponding to position information with respect to a parent node thereof.

Other objects and further features of the present invention will be apparent from the following detailed description when read in conjunction with the accompanying drawings.

BRIEF DESCRIPTION OF THE DRAWINGS

FIGS. 8A through 8O show correspondence of patterns and least significant codes;

FIG. 14 is a diagram showing a subject black and white image made up of two kinds of regions;

FIG. 16 is a flow chart for explaining the generation of the tree structure with respect to the black and white image shown in FIG. 14;

FIGS. 24A through 24F are diagrams for explaining the sequence of generating a dynamic tree structure according to the fourth embodiment;

DETAILED DESCRIPTION

Figure 1:
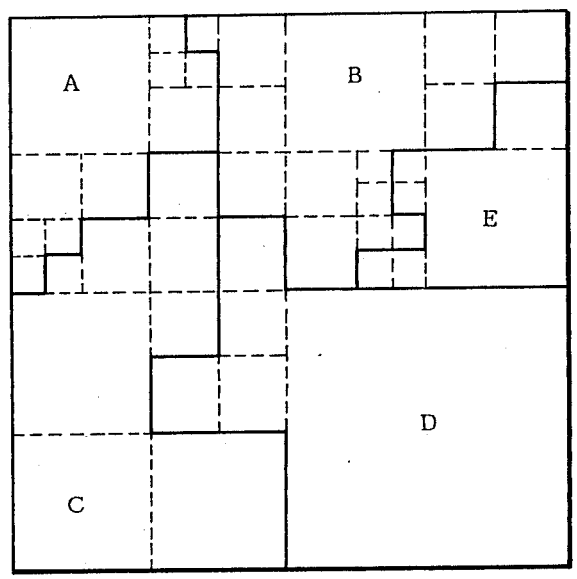
FIG. 1 is a diagram showing an example of an image made up of a plurality of kinds of regions.
Figure 3:
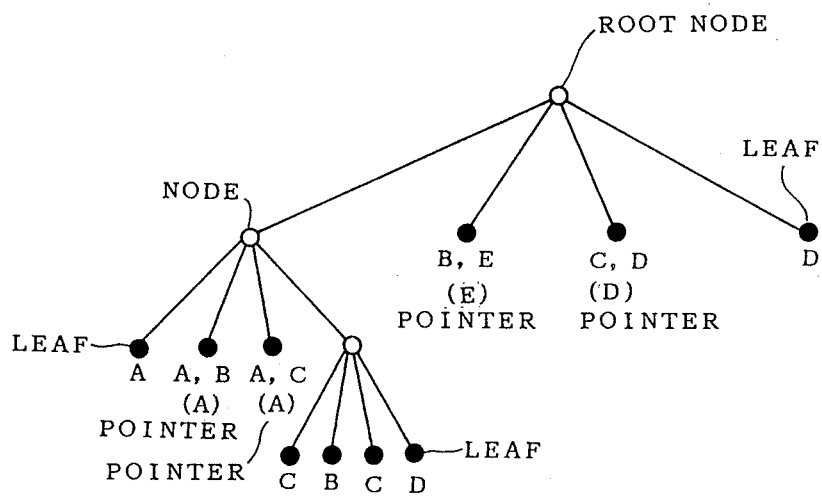
FIG. 3 shows a first level of a two-level tree structure describing the image shown in FIG. 1 according to a first embodiment of the method of the present invention.
Figure 4A:
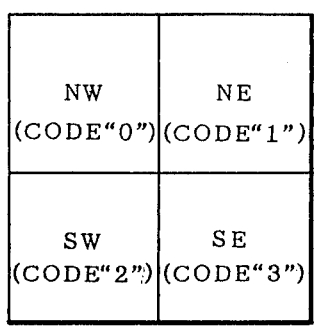
FIGS. 4A and 4B show the four divided regions (or subregions) of the image and the corresponding division (branching) of the node, respectively, for explaining control of division information by an expanded code.
Figure 4B:
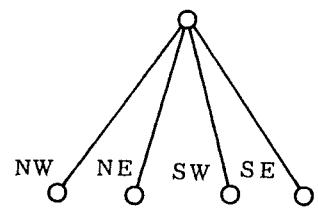

FIG. 3 shows a first level of a two-level tree structure describing the image shown in FIG. 1 according to a first embodiment of the method of the present invention. The first level of the two-level tree structure is obtained by equally dividing (decomposing) the image into four regions and equally subdividing (decomposing) each region into four subregions until each region or subregion is made up of one or two kinds of regions. The first level of the tree structure shown in FIG. 3 corresponds to the normal four-branch tree structure in which the image is equally divided into four regions until each region is made up of one or two kinds of regions. In a second level of the tree structure which will be described later in conjunction with FIGS. 7A through 7D, each region is recursively and equally subdivided into four subregions until each subregion is made up of solely of a single kind of region. FIGS. 4A and 4B show the four divided regions (or subregions) of the image and the corresponding division (branching) of the node, respectively, for explaining the description of division information by an expanded code.

In order to describe the tree structure as data, it becomes necessary to provide information showing how the nodes and the leaves connect in the tree structure. In principle, a pointer is used to connect the node and the leaf.

Figure 5A:
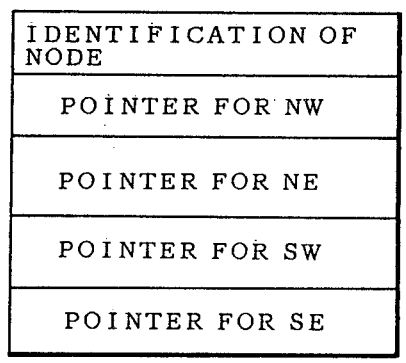
FIGS. 5A and 5B show the structures of a node and a leaf in a first level of the tree structure generated in the first embodiment, respectively.
Figure 5B:
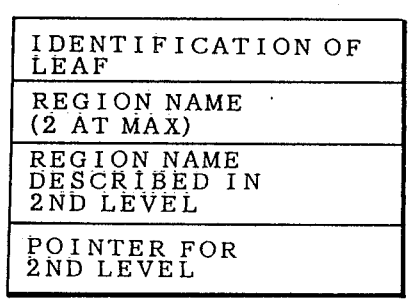

FIGS. 5A and 5B show the structures of a node and a leaf in the first level of the tree structure generated according to a first embodiment of the method of the present invention, respectively, and the tree structure can be described by such nodes and leaves. The node includes an identification code indicating a node, and pointer information (position information) NW, NE, SW and SE for each of the divided regions (or subregions). The leaf includes an identification code indicating a leaf, region name information included in the region (or subregion) obtained by the equal division into four, region name information described in the second level and selected as will be described hereunder and pointer information wiht respect to the second level of the tree structure in the case of the leaf including two kinds of regions.

Between the leaf corresponding to a region made up of one kind of region and the leaf corresponding to a region made up of two kinds of regions, the second level of the tree structure is used as a tree structure for the leaf corresponding to the region made up of two kinds of regions. The two kinds of region information are described as follows, and the kind of region having a smaller number of leaves between the two kinds of regions is described by the tree structure.

Figure 6:
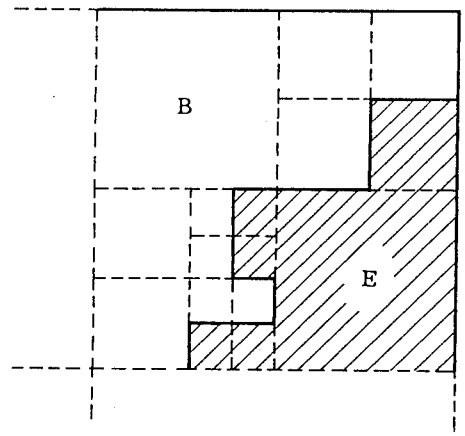
FIG. 6 shows the image of one (NE) of the four divided regions shown in FIG. 1 with respect to a leaf (B, E) made up of kinds B and E.

FIG. 6 shows the image of one (NE) of the four divided regions shown in FIG. 1 with respect to the leaf (B, E) including kinds of regions B and E. FIGS. 7A through 7D are diagrams for explaining the sequence of generating the second level of the tree structure according to the first embodiment of the method of the present invention.

Figure 7A:
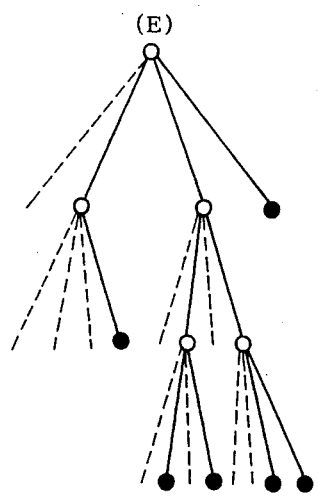
FIGS. 7A through 7D are diagrams for explaining the sequence of generating a second level of the tree structure according to the first embodiment.
Figure 7B:
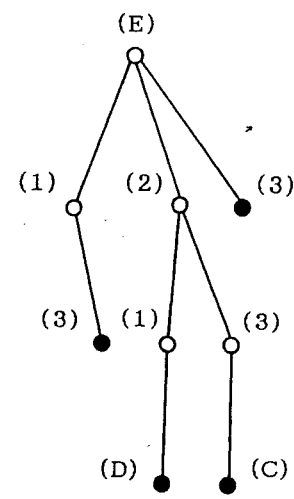

First, the region shown in FIG. 6 is recursively and equally subdivided into four subregions, and only the subject subregions are described by the tree structure as shown in FIG. 7A. Next, as shown in FIG. 7B, division information is added to each node of the tree structure shown in FIG. 7B. The division information is described by sequential data "0", "1", "2" and "3" which correspond respectively to NW, NE, SW and SE. At the leaf, a least significant code of the division information is described by one of codes "0" through "E" shown in FIGS. 8A through 8O so as to integrate a parent node into the leaf in correspondence therewith. All of the patterns are described by the codes shown in FIGS. 8A through 8O.

Figure 7C:
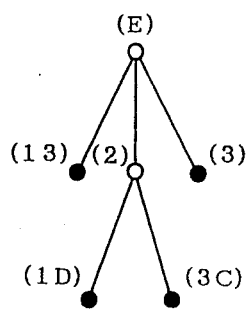
Figure 7D:
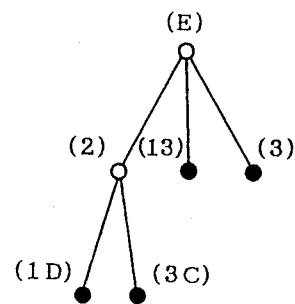

Then, a node which degree is one and having only one branch is delected as shown in FIG. 7C and integrated into a filial node or leaf thereof. Furthermore, at the nodes of each branch, the nodes are rearranged in order so that the leftmost node has a largest number of leaves connected thereto and the number of leaves connected to the node decreases toward the rightmost node as shown in FIG. 7D.

Figure 9A:
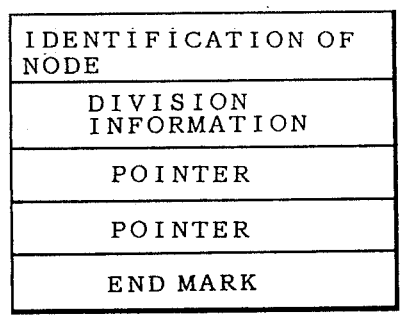
FIGS. 9A and 9B show the structures of the node and the leaf in the second level of the tree structure generated in the first embodiment, respectively.
Figure 9B:
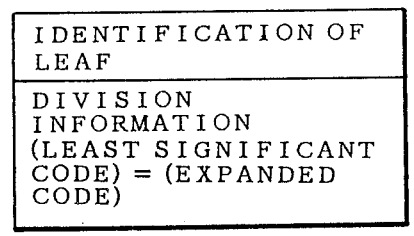

The second level of the tree structure described heretofore can be described as a collection of nodes and leaves having the structures shown in FIGS. 9A and 9B. As shown in FIG. 9A, the node in the second level includes an identification code indicating a node, the division information, two to four pointer information and end mark information which indicates the end of the pointer information. On the other hand, the leaf in the second level includes an identification code indicating a leaf, and the division information as shown in FIG. 9B.

Figure 2:
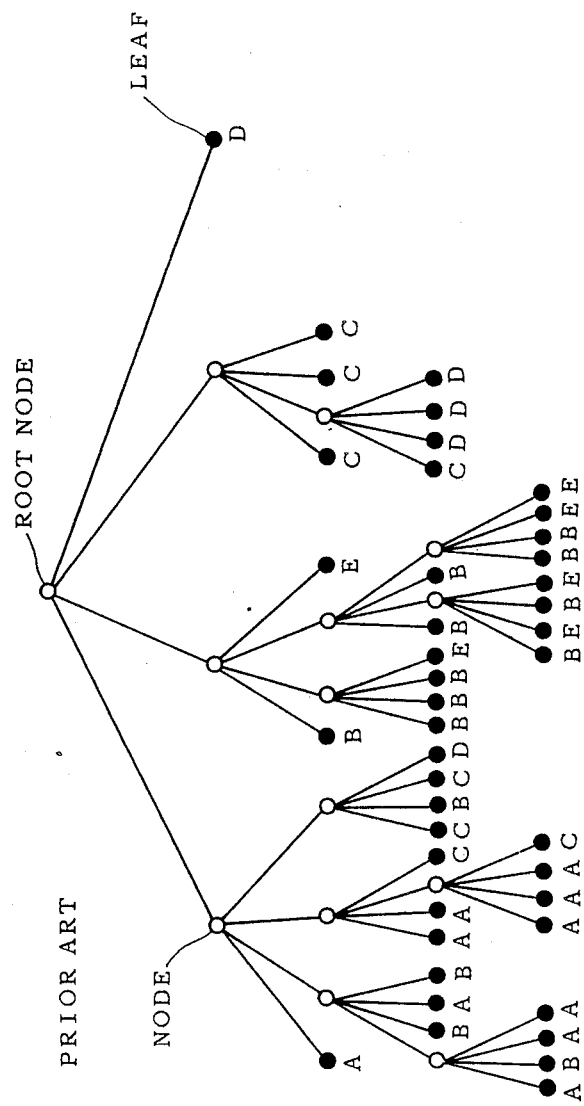
FIG. 2 shows the conventional four-branch tree structure describing the image shown in FIG. 1.

Compared to the conventional four-branch tree structure shown in FIG. 2, the number of nodes is considerably reduced by the two-level tree structure in which the first level controls the general information and the second level controls the detail information based on a minimum required description. According to the two-level tree structure, only the subject regions and subregions are described by the tree structure, and the nodes which degree is one are deleted and integrated into the filial node or leaf thereof. Hence, also from this point of view, it is possible to reduce the number of nodes compared to the normal four-branch tree structure.

By describing the division information by the expanded code shown in FIG. 4A, it is possible to reduce the number of leaves, and the number of nodes can be reduced when the nodes which degree is one are integrated into filial nodes or leaves thereof. In addition, by adding the division information to each node in the second level of the tree structure, it is possible to compensate for the hierarchy lost in the process of generating the tree structure, and the retrieval in the tree structure can be carried out efficiently, because the length of the division information describes the size of the region, and the inclusion relation can be derived by the simple matching of the division information. The longer the division information, the smaller the region size.

Figure 10:
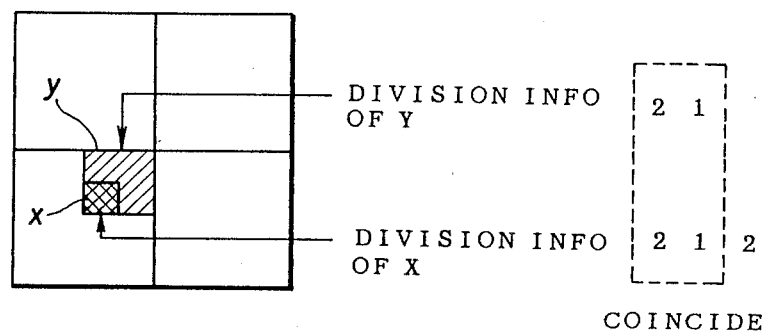
FIG. 10 is a diagram for explaining the inclusion relation.

In other words, as shown in FIG. 10, suppose that a discrimination is to be made on whether or not a subregion x of a region X is included in a subregion y of a region Y. When the division information of the region Y is described by n division information codes "21", it is discriminated that the subregion x is included in the subregion y when there are n or more division information codes "212" of the region X and the first n division information codes "21" of the division information of the region X coincide with the n division information codes "21" of the region Y.

However, at the leaf portion, the pattern matching is carried out based on the inclusion relation derived from the relation of FIGS. 4A and 4B. For example, the sequential data "0" is subjected to a pattern matching with each of the codes "0", "5", "6", "7", "8", "9", "A" and "E" respectively shown in FIGS. 8A, 8F, 8G, 8H, 8I, 8J, 8K and 8O.

By the pattern matching of a retrieval key and the division information of each node, the retrieval is carried out by tracing the leaf from the root node. In the two-level tree structure, the lower order (level) branch can be traced quicker by tracing the branch on the left hand side when the pattern matching is made from the left branch.

For this reason, a restructuring is made at the nodes of each branch to rearrange the node in order so that the leftmost node has a largest number of leaves connected thereto and the number of leaves connected to the node decreases toward the rightmost node. Although the tree structure itself has more weight on the left hand side and is unbalanced, this tree structure is balanced as for the retrieval time.

Next, a description will be given on the generation of the tree structure according to the first embodiment of the method of the present invention.

Figure 11:
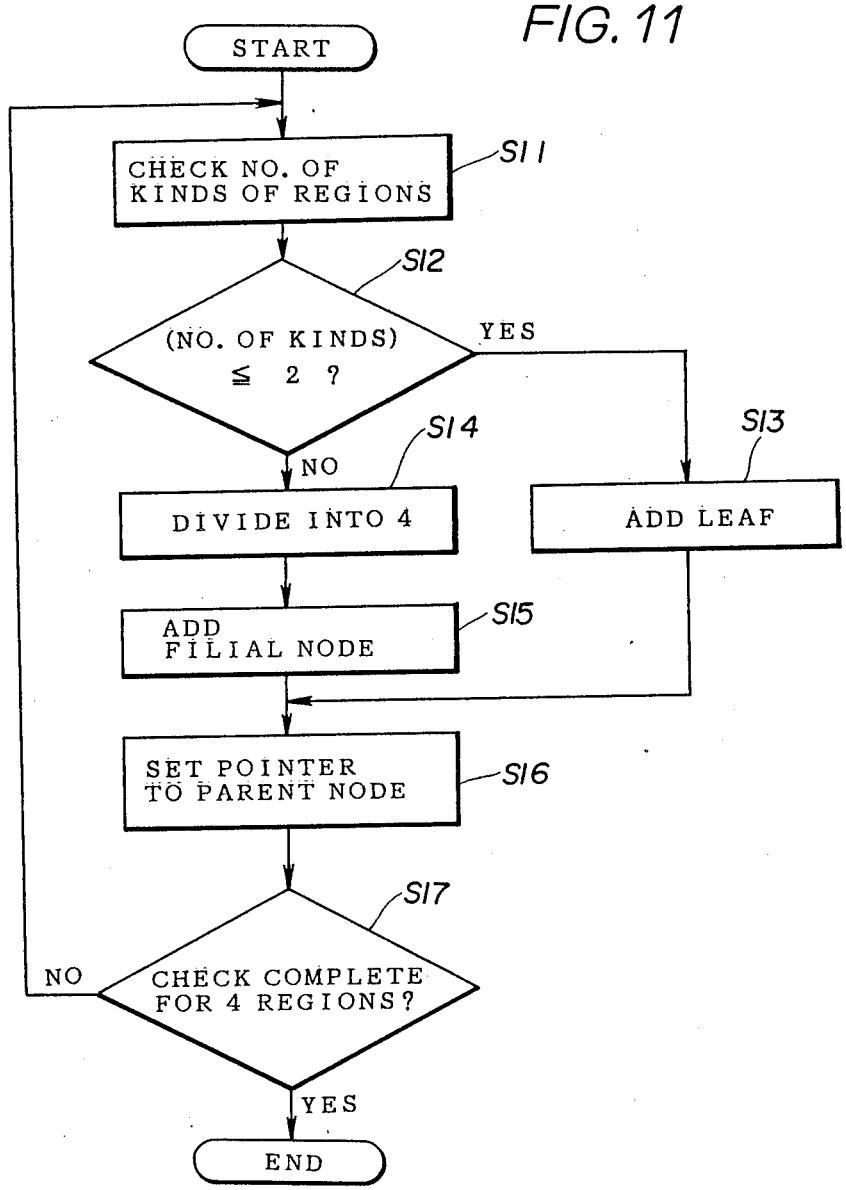
FIG. 11 is a flow chart for explaining the generation of the first level of the tree structure according to the first embodiment.

FIG. 11 is a flow chart for explaining the generation of the first level of the tree structure with respect to the entire image shown in FIG. 1. A step S11 checks the number of kinds of regions within the image (or region). A step S12 discriminates whether or not the number of kinds of regions within the region is two or less. When the discrimination result in the step S12 is YES, a step S13 adds to the node a leaf having the structure shown in FIG. 5B, and the process advances to a step S16. On the other hand, when the discrimination result in the step S12 is NO, a step S14 equally divides the region into four regions, and a step S15 adds to the node a filial node having the structure shown in FIG. 5A, and the process advances to the step S16.

The step S16 sets a pointer of the node or leaf to a parent node thereof, and a step S17 discriminates whether or not the checking is completed for each of the four divided regions. The process is ended when the discrimination result in the step S17 is YES. But when the discrimination result in the step S17 is NO, the steps S12 through S17 are repeated until the checking is completed for all of the four divided regions.

Figure 12:
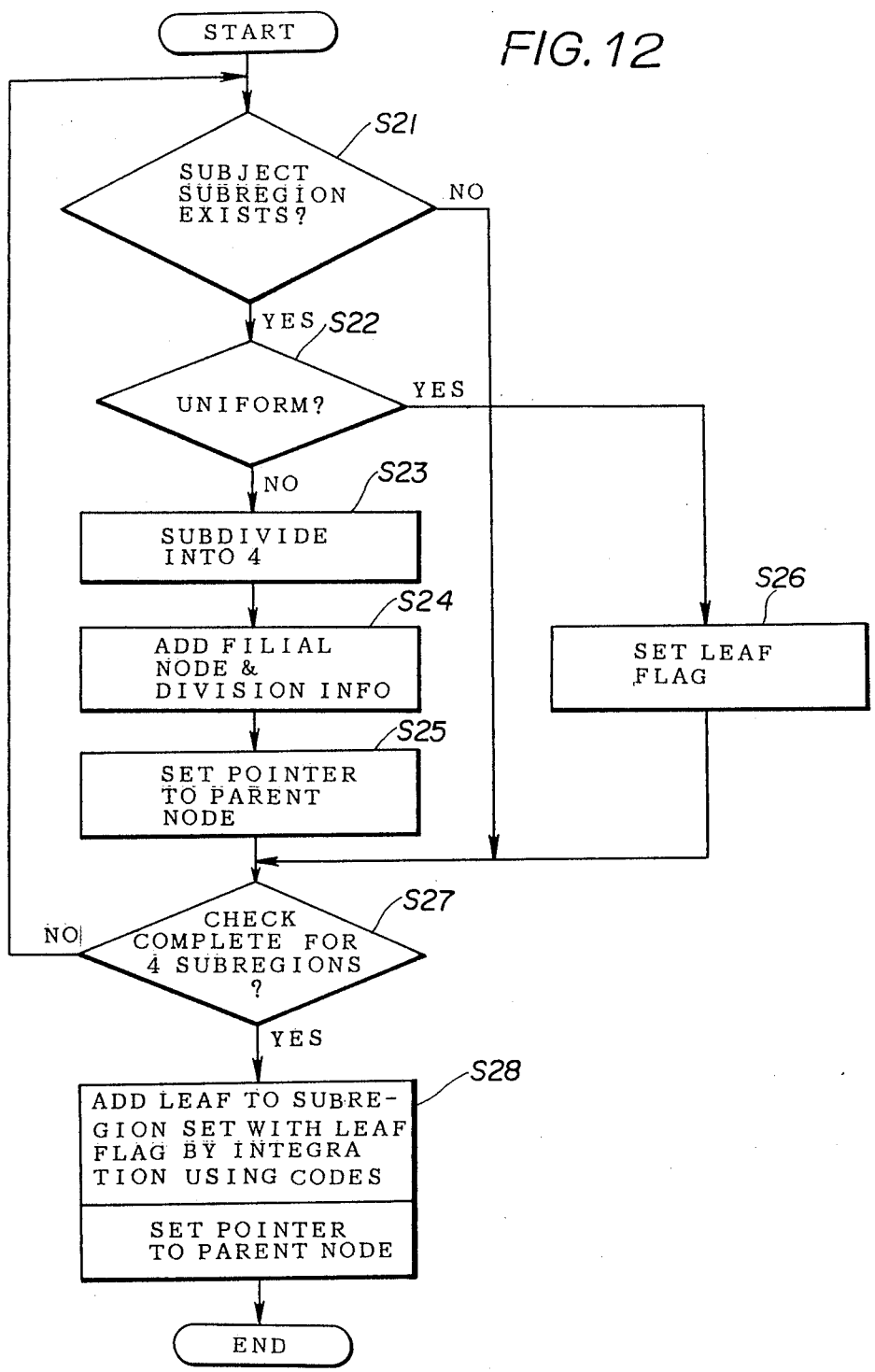
FIGS. 12 and 13 respectively are flow charts for explaining the generation of the second level of the tree structure according to the first embodiment.

FIG. 12 is a flow chart for explaining the generation of the second level of the tree structure with respect to one of the divided regions of the image shown in FIG. 1. The tree structure shown in FIG. 7B is generated by recursively carrying out the process of FIG. 12.

A step S21 discriminates whether or not there exists a subject subregion in the subregions. When the discrimination result in the step S21 is NO, the process advances to a step S27. On the other hand, when the discrimination result in the step S21 is YES, a step S22 discriminates whether or not the subject region is a uniform region made up solely of a single kind of region. When the discrimination result in the step S22 is YES, a step S26 sets a leaf flag with respect to the uniform subregion, and the process advances to the step S27. But when the discrimination result in the step S22 is NO, a step S23 equally subdivides the subregion into four subregions, and step S24 adds a filial node having the structure shown in FIG. 9A and adds the division information.

A step S25 sets a pointer of the node to a parent node thereof, and the process advances to the step S27. The step S27 discriminates whether or not the checking is completed for each of the four subdivided subregions. When the discrimination result in the step S27 is YES, a step S28 with respect to subregion set with the leaf flag adds a leaf having the structure shown in FIG. 9B by integration using the codes shown in FIGS. 8A through 8O, and further, sets a pointer of the leaf to a parent node thereof. The process is ended after the step S28. On the other hand, when the discrimination result in the step S27 is NO, the process returns to the step S21, and the steps S21 through S27 are repeated until the checking is completed for each of the four subdivided subregions.

Figure 13:
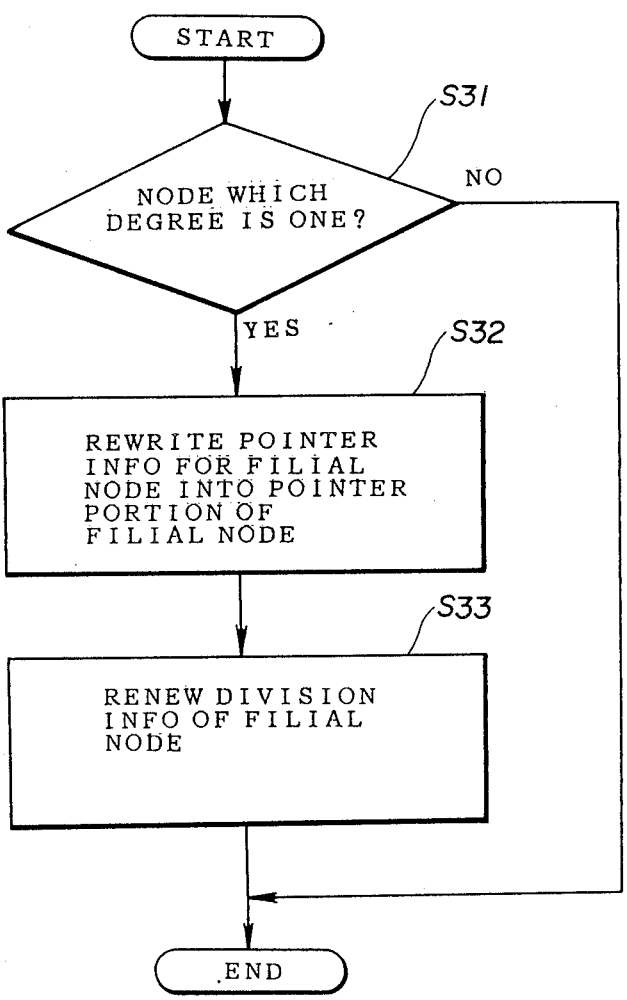

FIG. 13 is a flow chart for explaining the generation of the second level of the tree structure with respect to one of the subdivided subregions. The tree structure shown in FIG. 7C is generated by recursively carrying out the process of FIG. 13 with respect to all of the nodes.

A step S31 discriminates whether or not the degree of the node is one, that is, a node which degree is one and having only one branch. When the discrimination result in the step S31 is NO, the process is ended. But when the discrimination result in the step S31 is YES, a step S2 rewrites the pointer information in the node which degree is one for the filial node into a pointer portion of the filial node or leaf thereof. A step S33 renews the division information of the filial node, and the process is ended. The desired tree structure is generated by carrying out the restructuring shown in FIG. 7C.

As described heretofore, it is possible to greatly compress the data by using the two-level tree structure to describe the image made up of various kinds of regions. Various kinds of retrievals on a subject region can be carried out efficiently.

According to the present embodiment, the description is given for the application to an image made up of a plurality of kinds of regions in a two-dimensional space. However, it is evident that the present embodiment is also applicable to the description of the image made up of a plurality of kinds of regions in an n-dimensional space.

Next, a description will be given on a second embodiment of the method according to the present invention applied to a binary (two-valued) image in a two-dimensional space. FIG. 14 shown a subject binary image made up of two kinds of regions, that is, black and white regions, In FIG. 14, the black regions are indicated by a hatching. FIGS. 15A through 15D are diagrams for explaining the sequence of generating the tree structure according to the second embodiment. In FIGS. 15A through 15D, a rectangular mark indicates a leaf of a white region, a black rectangular mark indicates a leaf of a black region, a circular mark indicates a node, and a black circular mark indicates a leaf which is finally obtained.

Figure 15A:
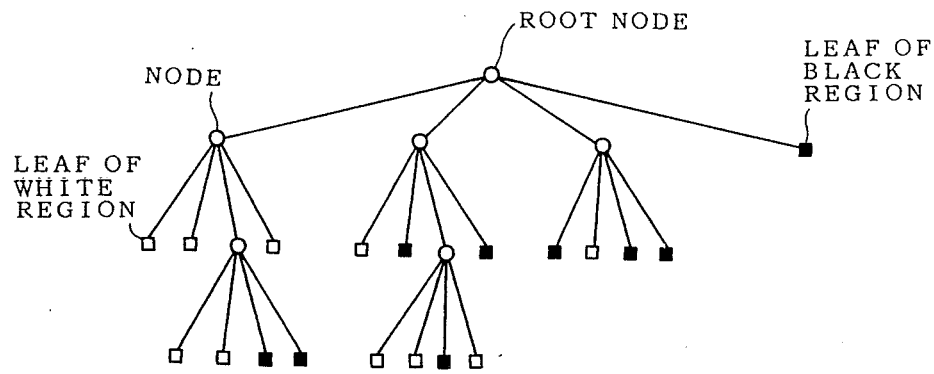
FIGS. 15A through 15D are diagrams for explaining the sequence of generating the tree structure according to a second embodiment of the method of the present invention.

First, the black and white image shown in FIG. 14 is recursively and equally divided into four regions until each divided region is made up solely of one kind of region, that is, black or white region, and the image is described by a four-branch tree structure shown in FIG. 15A. Next, when describing only the black regions out of the black and white regions, the white leaves in FIG. 15A are deleted and a tree structure only describing the black regions is obtained as shown in FIG. 15B.

Figure 15B:
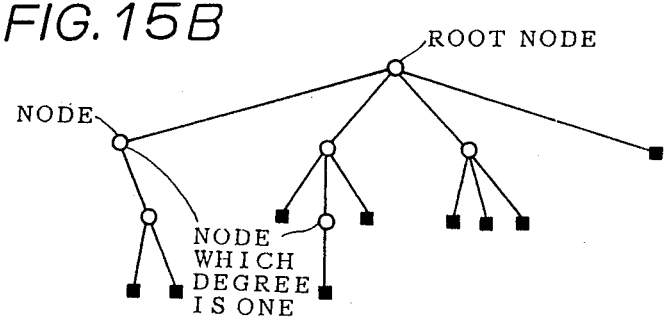
Figure 15C:
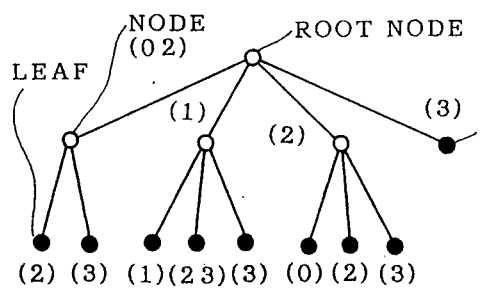

In the tree structure shown in FIG. 15B, node which degree is one and having only one branch are deleted and integrated into a filial node or leaf thereof. In addition, division information is added to this filial node or leaf and the remaining leaves so as to obtain a tree structure shown in FIG. 15C. The division information is described by the sequential data "0", "1", "2" and "3" which correspond respectively to NW, NE, SW and SE as described before in conjunction with FIG. 4A.

Figure 15D:
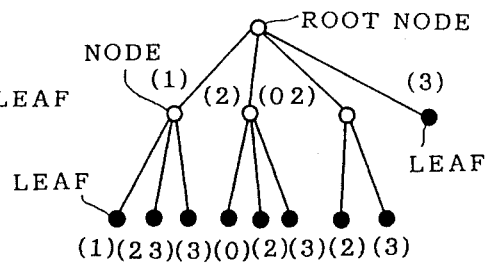

Then, at the nodes of each branch, the nodes are rearranged in order so that the leftmost node has a largest number of leaves connected thereto and the number of leaves connected to the node decreases toward the rightmost node as shown in FIG. 15D.

The tree structure can be described as a collection of nodes and leaves having the structures identical to those described before in conjunction with FIGS. 9A and 9B. According to the present embodiment, since there are only two kinds of regions in the image shown in FIG. 14, the equal division of the image into four regions corresponds to the first level of the tree structure generated according to the first embodiment, and the equal subdivision thereafter of each region into four subregions until each subregion is made up solely of one kind of region corresponds to the second level of the tree structure generated according to the first embodiment.

Next, a description will be given on the generation of the tree structure according to the second embodiment.

FIG. 16 is a flow chart for explaining the generation of the tree structure with respect to the black and white image shown in FIG. 14. A step S41 recursively describes only the subject region by the four-branch structure, and a step S42 integrates each node which degree is one into a filial node or leaf thereof and adds the division information to the filial node or leaf. A step S43 generates the tree structure by making the restructuring at the nodes of each branch to rearrange the nodes in order so that the leftmost node has the largest number of leaves connected thereto and the number of leaves connected to the node decreases toward the rightmost node. The integration of the nodes and the restructuring can be carried out with ease by rewriting the pointers.

Figure 17:
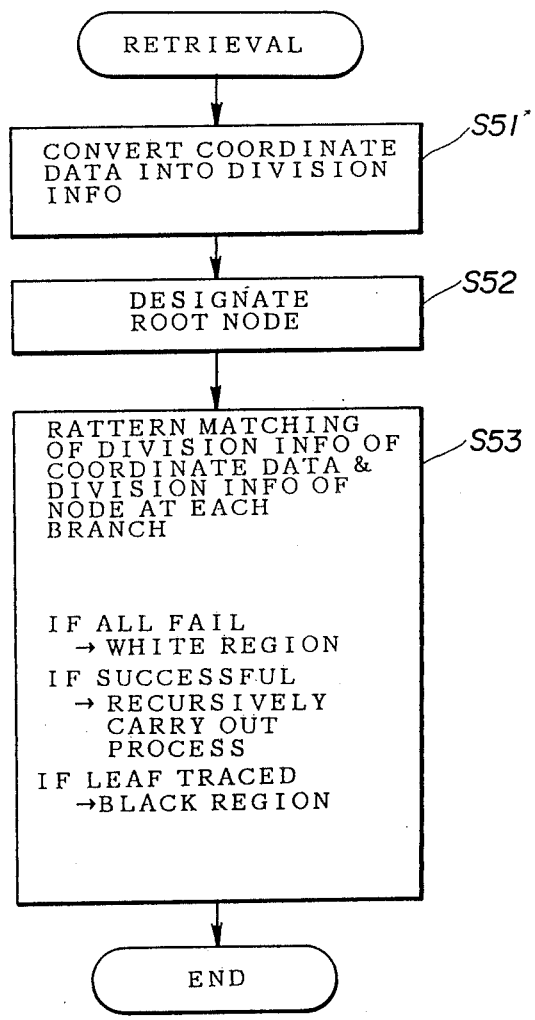
FIG. 17 is a flow chart for explaining a retrieval to detect whether or not a black region exists at a designated coordinate.

FIG. 17 is a flow chart for explaining a retrieval to detect whether or not a black region exists at a designated coordinate. When the retrieval is started, a step S51 converts coordinate data into division information. A step S52 designates a root node. A step S53 makes the pattern matching of the division infomation of the coordinate data and the division information of the node at each branch. In the case where the pattern matching in the step S53 all fail, it is discriminated that the subject region is a white region. On the other hand, when the pattern matching is successful in the step S53, the process shown in FIG. 17 is carried out recursively, and it is discriminated that the subject region is a black region when a leaf is traced. In this case, the retrieval of the black region is made correctly, and the process is ended.

According to the present embodiment, the description is given for the application to an image made up of two kinds of regions in a two-dimensional space. However, it is evident that the present embodiment is also applicable to the description of an image made up of two kinds of regions in an n-dimensional space.

Furthermore, it is possible to efficiently describe the image information by describing one of the two kinds of regions with the smaller number of leaves by the tree structure and using as the control information of the tree structure the names of the kinds of regions and the name of the one kind of region described by the tree structure.

Next, a description will be given on a thrid embodiment of the method according to the present invention applied to the black and white image in the two-dimensional space shown in FIG. 14. FIGS. 18A through 18D are diagrams for explaining the sequence of generating the tree structure according to the third embodiment. In FIGS. 18A through 18D, a rectangular mark indicates a leaf of a white region, a black rectangular mark indicates a leaf of a black region, a circular mark indicates a node, and a black circular mark indicates a leaf which is finally obtained.

Figure 18A:
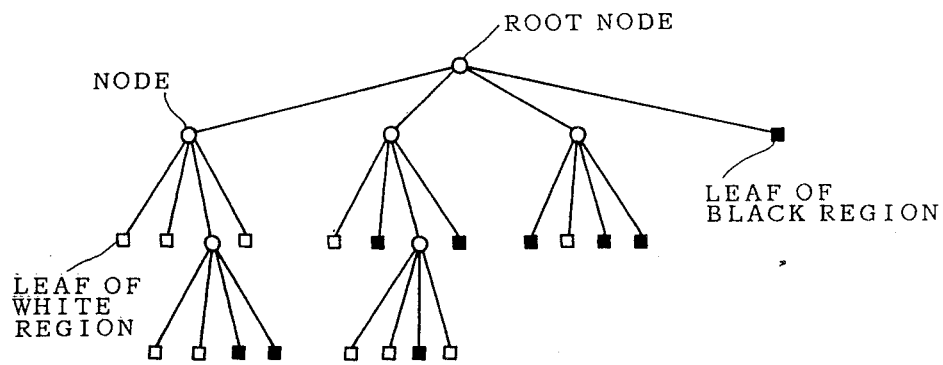
FIGS. 18A through 18D are diagrams for explaining the sequence of generating the tree structure according to a third embodiment of the method of the present invention.

First, the black and white image shown in FIG. 14 is recursively and equally divided into four regions until each region is made up solely of one kind of region, that is, black or white region, and the image is described by a four-branch tree structure shown in FIG. 18A. Next, when describing only the black regions out of the black and white regions, the white leaves in FIG. 18A are deleted and a tree structure only describing the black regions is obtained as shown in FIG. 18B.

Figure 18B:
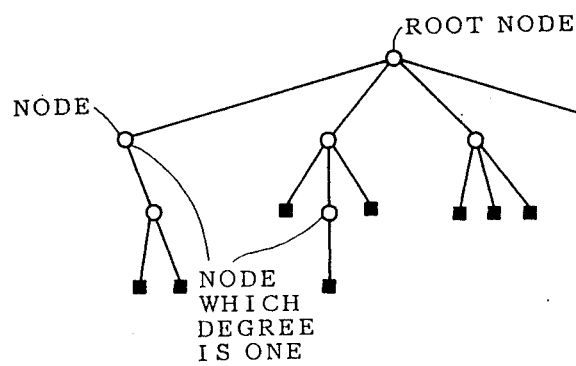
Figure 18C:
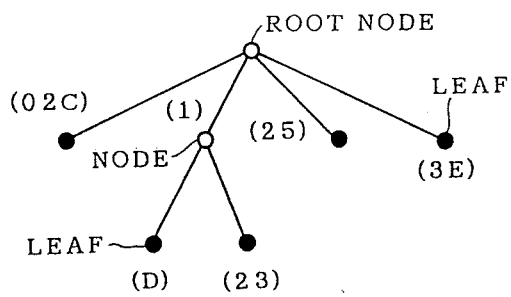

In the tree structure shown in FIG. 18B, nodes which degree is one and having only one branch are deleted and integrated into a filial node or leaf thereof, and in addition, division information is added to the filial node or leaf and the remaining leaves so as to obtain a tree structure shown in FIG. 18C. The division information is described by the sequential data "0", "1", "2" and "3" which correspond respectively to NW, NE, SW and SE as described before in conjunction with FIG. 4A. At the leaf, a least significant code of the division information is described by one of the codes "0" through "E" shown in FIGS. 8A through 8O described before so as to integrate the leaves connected to a common parent node. All of the patterns are described by the codes shown in FIGS. 8A through 8O.

Figure 18D:
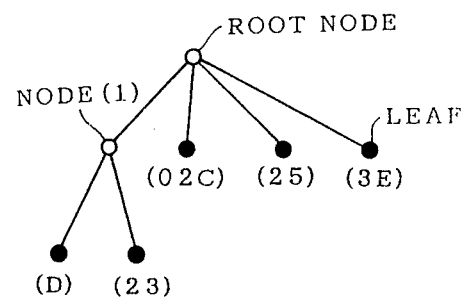

In other words, a node which degree is one and having only one branch is deleted as shown in FIG. 18C and integrated into a filial node or leaf thereof. Furthermore, at the nodes of each branch, the nodes are rearranged in order so that the leftmost node has a largest number of leaves connected thereto and the number of leaves connected to the node decreases toward the rightmost node as shown in FIG. 18D.

Compared to the conventional four-branch tree structure, the number of nodes is considerably reduced by describing only the subject region by the tree structure in which the nodes which degree is one are deleted and integrated into the filial node or leaf thereof. In addition, the number of leaves can be reduced by describing the leaf portion by the expanded code shown in FIGS. 8A through 8O described before.

Furthermore, by adding the division information to each node, it is possible to compensate for the hierarchy lost in the process of generating the tree structure, and the retrieval in the tree structure can be carried out efficiently, because the length of the division information describes the size of the region, and the inclusion relation can be derived by the simple matching of the division information.

The tree structure can be described as a collection of nodes and leaves having the structures identical to those described before in conjunction with FIGS. 9A and 9B. According to the present embodiment, because there are only two kinds of regions in the image shown in FIG. 14, the equal division of the image into four regions corresponds to the first level of the tree structure generated according to the first embodiment, and the equal subdivision thereafter of each region into four subregions until each subregion is made up solely of one kind of region corresponds to the second level of the tree structure generated according to the first embodiment.

Next, a description will be given on the generation of the tree structure according to the third embodiment.

Figure 19:
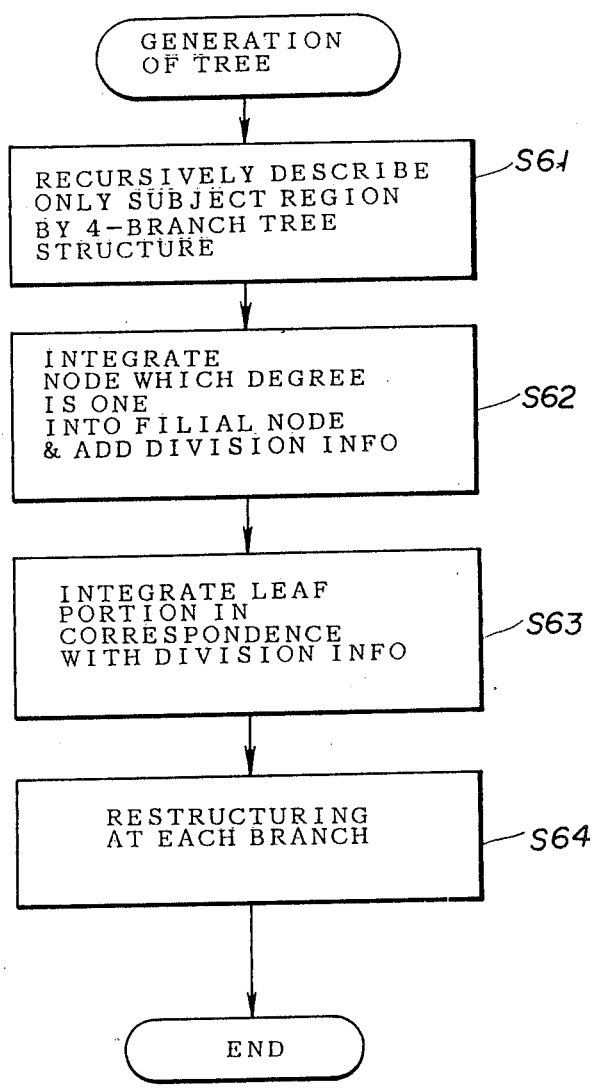
FIG. 19 is a flow chart for explaining the generation of the tree structure with respect to the black and white image shown in FIG. 14.

FIG. 19 is a flow chart for explaining the generation of the tree structure with respect to the black and white image shown in FIG. 14. A step S61 recursively describes only the subject regions by the four-branch structure, and a step S62 integrates each node which degree is one into a filial node or leaf thereof and adds the division information to the filial node or leaf and the remaining leaves. A step S63 integrates the leaf portion in correspondence with the division information codes. A step S64 generates the tree structure shown in FIG. 18D by making the restructuring at the nodes of each branch to rearrange the nodes in order so that the leftmost node has the largest number of leaves connected thereto and the number of leaves connected to the node decreases toward the rightmost node. The integration of the nodes and the restructuring can be carried out with ease by rewriting the pointers.

The retrieval to detect whether or not a black region exists at a designated coordinate can be carried out similarly as described before in conjunction with FIG. 17.

According to the present embodiment, the description is given for the application of an image made up of two kinds of regions in a two-dimensional space. However, it is evident that the present embodiment is also applicable to the description of an image made up of two kinds of regions in an n-dimensional space.

Furthermore, it is possible to efficiently control the image information by describing one of the two kinds of regions with the smaller number of leaves by the tree structure, and using as the control information of the tree structure the names of the two kinds of regions and the name of the one kind of region described by the tree structure.

Figure 20:
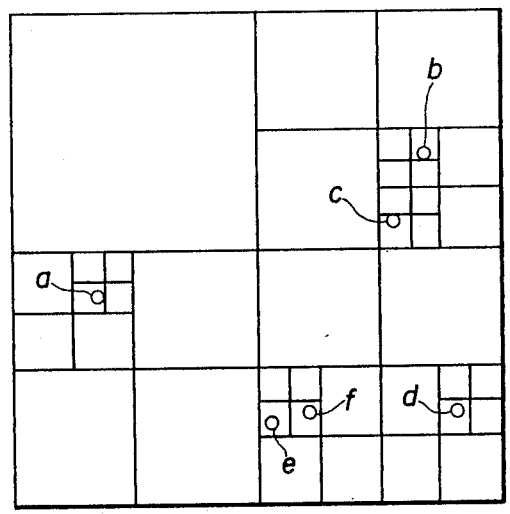
FIG. 20 shows an image in a two-dimensional space including point information.
Figure 21A:
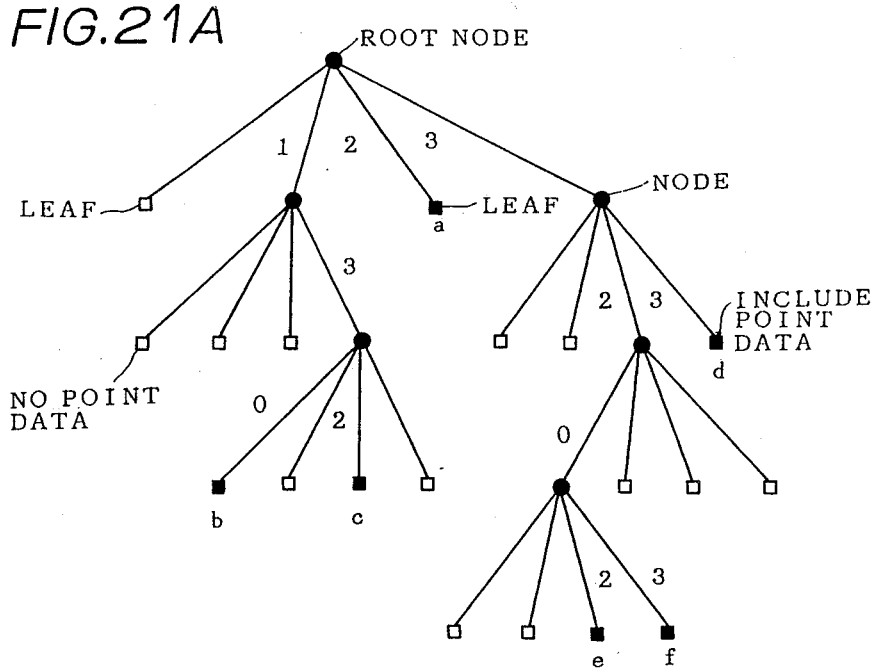
FIGS. 21A through 21C are diagrams for explaining the sequence of generating a static tree structure according to a fourth embodiment of the method of the present invention.
Figure 21B:
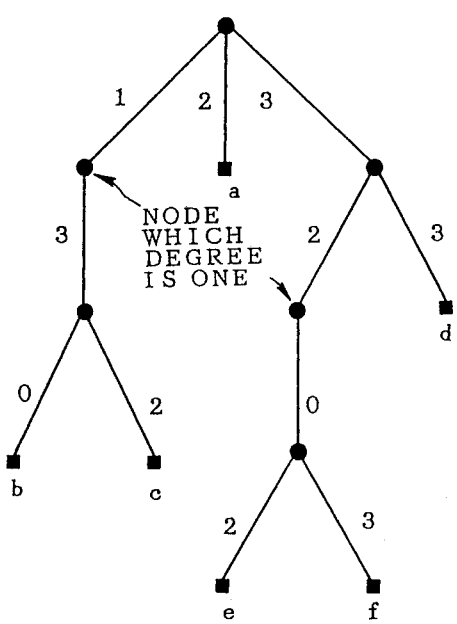
Figure 21C:
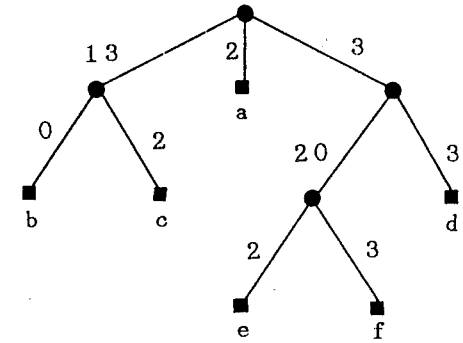

Next, a description will be given on a fourth embodiment of the method according to the present invention applied to the description of point information in a two-dimensional space. FIG. 20 shows a subject image in the two-dimensional space containing point information a, b, c, d, e and f within regions and subregions of the subject image. FIGS. 21A through 21C are diagrams for explaining the sequence of generating a static tree structure according to the fourth embodiment.

First, the image shown in FIG. 20 is equally divided into four regions, and each region is recursively and equally subdivided into four subregions until only one point exists within the subregion. Hence, the image is described by a tree structure shown in FIG. 21A. In FIGS. 21A through 21C, a rectangular mark indicates a leaf, a black rectangular mark indicates a leaf including point data, and a black circular mark indicates a node. The leaf indicated by the rectangular mark includes no point data. On the othr hand, it is possible to add to the leaf indicated by the black rectangular mark information related to the point data. The division information is described by the sequential data "0", "1", "2" and "3" which correspond respectively to NW, NE, SW ans SE as described before in conjunction with FIG. 4A.

Next, the leaves including no point data are deleted, and only the subject points are described by the tree structure as shown in FIG. 21B. In addition, nodes which degree is one and having only one branch are deleted and integrated into a filial node thereof, and further, the division information is added as shown in FIG. 21C.

Figures 22A, 22B:
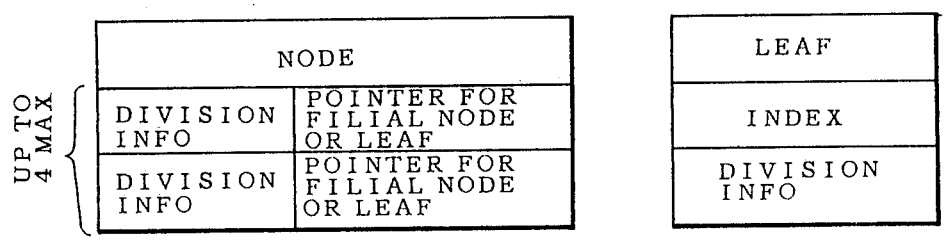
FIGS. 22A and 22B show the structures of the node and the leaf in the fourth embodiment, respectively.

FIGS. 22A and 22B respectively show the structures of the node and the leaf in the fourth embodiment. As shown in FIG. 22A, in addition to a node identification code, the node may include as the division information up to a maximum of four pointers to the filial node or leaf thereof. The leaf includes a leaf identification code, an index and the division information.

Figure 23:
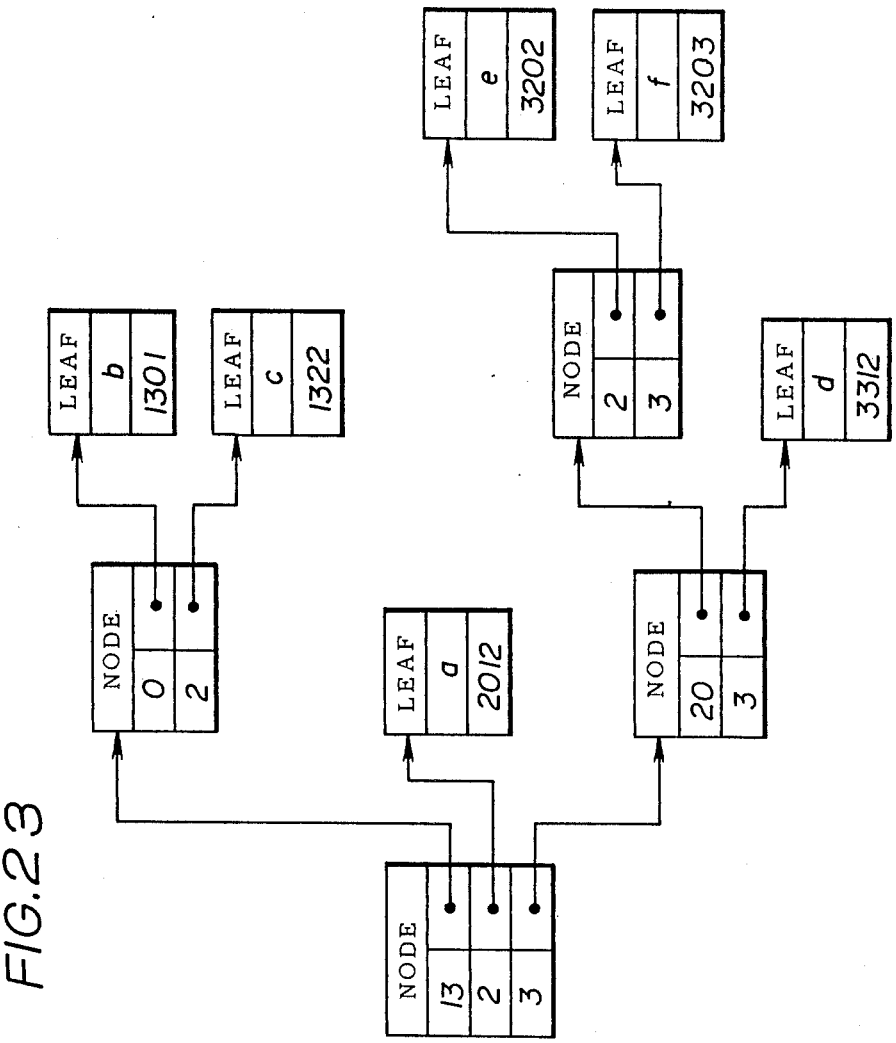
FIG. 23 is a diagram showing the tree structure shown in FIG. 21C using the structures of the node and the leaf shown in FIGS. 22A and 22B.

The tree structure shown in FIG. 21C can be illustrated as shown in FIG. 23 when the structures of the node and the leaf are described by use of the structures shown in FIGS. 22A and 22B. In FIG. 23, the root node at a pointer "0" has no node nor leaf connected thereunder.

FIGS. 24A through 24F are diagrams for explaning the sequence of generating a dynamic tree structure according to the fourth embodiment. FIG. 24A shows a tree in which only the point a exists. When the point b is entered into the tree shown in FIG. 24A, a leaf is added in a width direction as shown in FIG. 24B because this point b is not included in the node containing the point a. Next, when the point c is entered, a node is added in a depth direction as shown in FIG. 24C, the division information is renewed and a leaf is added, since the point c is included in the node containing the point b.

Then, when the point d is entered, a leaf is added in the width direction as shown in FIG. 24D because the piont d is not included in any of the nodes. When the point e is entered, a node is added in the depth direction as shown in FIG. 24E, the division information is renewed and a leaf is added, since the point e is included in the node containing the point d. In addition, when the point f is entered, a node is added in the depth direction as shown in FIG. 24F, the division information is renewed and a leaf is added, because the point f is included in the node containing the point e.

The process of generating the static tree structure according to the fourth embodiment is basically the same as that described before in conjunction with FIG. 16, and a description thereof will be omitted.

Figure 25A:
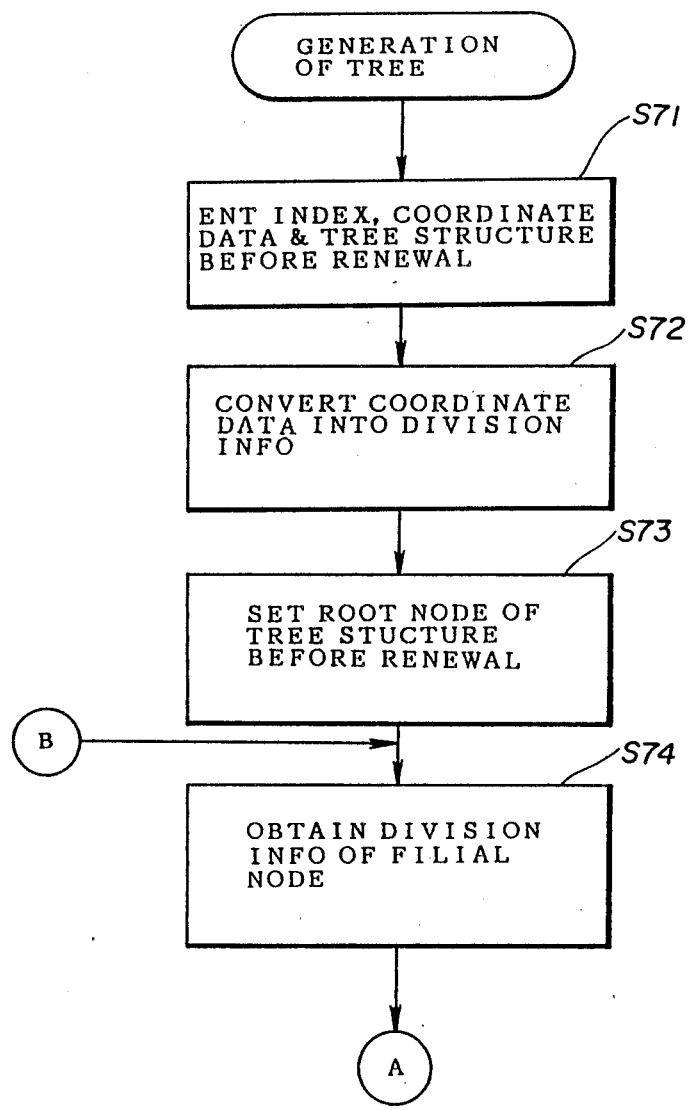
FIG. 25A and 25B is a flow chart for explaining the sequence of generating the dynamic tree structure with respect to the image shown in FIG. 20 according to the fourth embodiment.
Figure 25B:
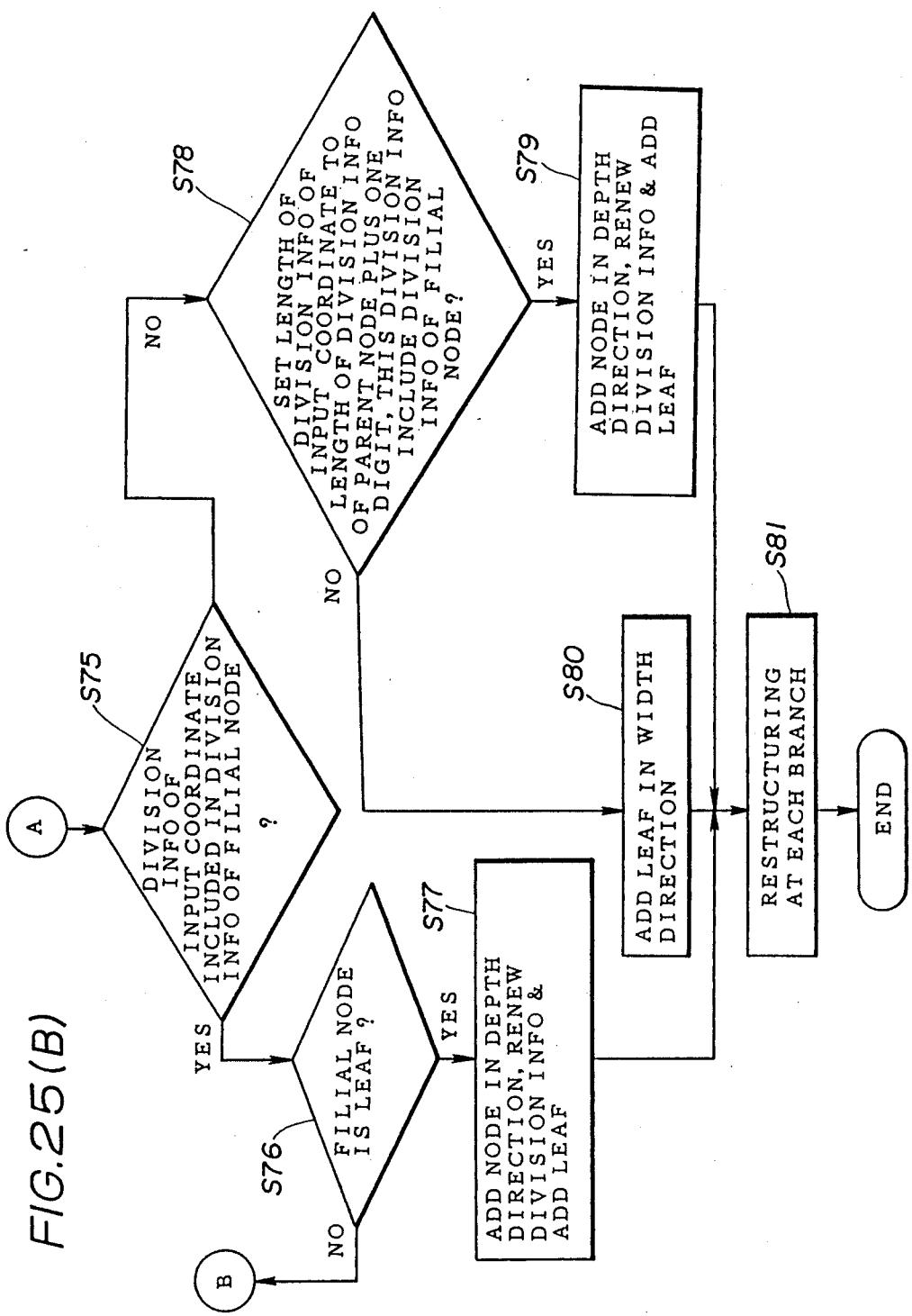

FIG. 25A and 25B are flow charts for explaining the sequence of generating the dynamic tree structure with respect to the image shown in FIG. 20 according to the fourth embodiment. A step S71 enters index, coordinate data and the tree structure before the renewal, and a step S72 converts the coordinate data into division information. A step S73 sets a root node of the tree structure before the renewal. A step S74 obtains the division information of a filial node, and a step S75 discriminates whether or not the division information of the input coordinate is included in the division information of the filial node.

When the discrimination result in the step S75 is YES, a step S76 discriminates whether or not the filial node is a leaf. When the discrimination result in the step S76 is YES, a step S77 adds a node in the depth direction, renews the division information and adds a leaf. Then, a step S81 makes a restructuring at the nodes of each branch to rearrange the nodes in order so that the leftmost node has a largest number of leaves connected thereto and the number of leaves connected to the node decreases toward the rightmost node. On the other hand, when the discrimination result in the step S76 is NO, the process is returned to the step S74.

When the discrimination result in the step S75 is NO, a step S78 sets the length of the division information of the input coordinate to the length of the division information of the parent node plus one digit, and discriminates whether or not this division information includes the division information of the filial node. When the discrimination result in the step S78 is YES, a step S79 adds a node in the depth direction, renews the division information and adds a leaf. Thereafter, the step S81 makes the restructuring described before.

On the other hand, when the discrimination result in the step S78 is NO, a step S80 adds a leaf in the width direction, and the step S81 thereafter makes the restructuring.

Compared to the conventional four-branch tree structure, the number of nodes is considerably reduced by integrating the nodes. In addition, by adding the division information to each node, it is possible to compensate for the hierarchy lost in the process of generating the tree structure, and the retrieval in the tree structure can be carried out efficiently, because the length of the division information describes the size of the region, and the inclusion relation can be derived by the simple matching of the division information.

Figure 26:
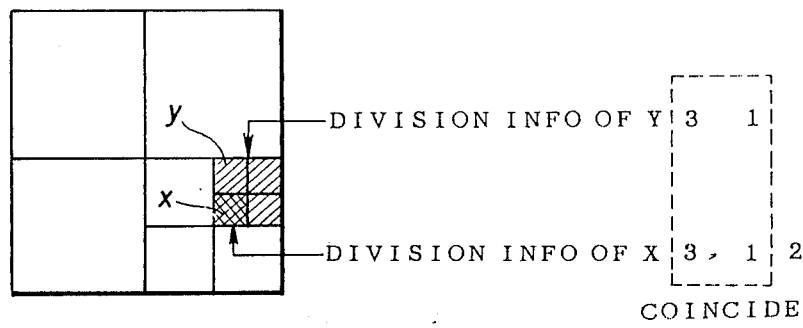
FIG. 26 is a diagram for explaining the inclusion relation.

In other words, as shown in FIG. 26, suppose that a discrimination is to be made on whether or not a subregion x of a region X containing the point d is included in a subregion y of a region Y. When the division information of the region Y is described by n division information codes "31", it is discriminated that the subregion x is included in the subregion y when there are n or more division information codes "312" of the region X and the first n division information codes "31" of the division information of the region X coincide with the n division information codes "31" of the region Y.

By the pattern matching of a retrieval key and the division information of each node, the retrieval is carried out by tracing the leaf from the root node. In the tree structure, the lower order (level) branch can be traced quicker by tracing the branch on the left hand side when the pattern matching is made from the left branch. For this reason, a restructuring is made at the nodes of each branch to rearrange the nodes in order so that the leftmost node has a largest number of leaves connected thereto and the number of leaves connected to the node decreases toward the rightmost node. Although the tree structure itself has more weight on the left hand side and is unbalanced, this tree structure is balanced as for the retrieval time.

Figure 27:
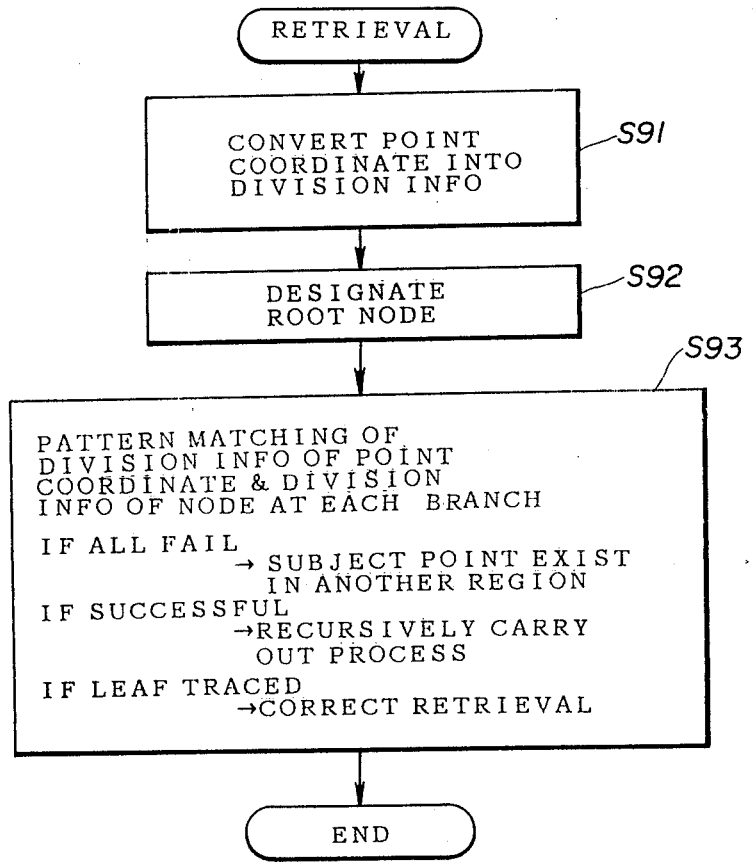
FIG. 27 is a flow chart for explaining a retrieval to detect whether or not a point exists at a designated coordinate.

FIG. 27 is a flow chart for explaining a retrieval to detect whether or not a point exists at a designated coordinate. When the retrieval is started, a step S91 converts the point cooordinate (coordinate data) into division information having a predetermined size. A step S92 designates a root node. A step S93 makes the pattern matching of the division information of the point coordinate and the division information of the node at each branch. In the case where the pattern matching in the step S93 all fail, it is discriminated that the subject point exists in another region. On the other hand, when the pattern matching is successful in the step S93, the process shown in FIG. 27 is carried out recursively, and it is discriminated that the subject point exists in the region when a leaf is traced. In this case, the retrieval of the subject point is made correctly, and the process is ended.

According to the present embodiment, the description is given for the application to an image including point information in a two-dimensional space. However, it is evident that the present emmbodiment is also applicable to the description of an image including point information in an n-dimensional space.

Further, the present invention is not limited to these embodiments, but various variations and modifications may be made without departing from the scope of the present invention.

What is claimed is:

1. A method of describing an image made up of a plurality of kinds of regions in an n-dimensional space by a tree structure, said method comprising:

a first step of recursively and equally dividing said image in the n-dimensional space into $2^n$ regions until each of the $2^n$ regions include two or less kinds of regions, thereby making a first level of said tree structure having a root node corresponding to said image in its entirety, L nodes connected to said root node and each corresponding to a region with three or more kinds of regions and M leaves connected to said root node or a node and each corresponding to a region with two or less kinds of regions, where $L = 0, 1, 2, \ldots, n$, $M1, 2, 3, \ldots, n$ and $L + M = n$, each of said nodes having branches branching out therefrom and connecting to a filial node or leaf thereof; and a second step of recursively and equally subdividing each of said $2^n$ regions in the n-dimensional space into $2^n$ subregions until each subregion includes only one kind of region and for describing only one of two kinds of regions by a tree structure in which each node which degree is one and only having one branch is integrated into a filial node or leaf thereof, thereby making a second level of said tree structure, each node in the second level of said tree structure being added with first division information described by sequential data of $2^n$ kinds of codes corresponding to position information of each node with respect to a parent node thereof, each leaf in the second level of said tree structure being added with second division information, said second division information describing at least a least significant code of said first division information by $2^n$ or more kinds of codes which are pattern information of each leaf with respect to a parent node thereof, said tree structure describing said image in the first and second levels thereof.

2. A method as claimed in claim 1 in which each of said nodes in the first level of said tree structure include pointer information indicating a position of a corresponding region, and each of said leaves in the first level of said tree structure include information indicating a kind of region of a corresponding region.

3. A method as claimed in claim 2 in which each of said leaves corresponding to a region including two kinds of regions in the first level of said tree structure further include pointer information to the second level of said tree structure and information indicating a kind of subregion described in the second level of said tree structure.

4. A method as claimed in claim 3 in which said node in the level of said tree structure includes in addition to said first division information pointer information indicating a position of a predetermined number of subregions and end mark information indicating of an end of said pointer information.

5. A method as claimed in claim 1 in which said node in the second level of said tree structure includes in addition to said first division information pointer information indicating a position of a predetermined number of subregions and end mark information indicating an end of said pointer information.

6. A method as claimed in claim 1 which said first step comprises the substeps of:

checking a number of kinds of regions within an arbitrary one of the $2^n$ regions;

adding a leaf to a node corresponding to the arbitrary region when two or less kinds of regions exist in the arbitrary region;

adding a filial node to the node corresponding to the arbitrary region when three or more kinds of regions exists in the arbitrary region; and setting a pointer of the added leaf or filial node to a parent node thereof, said substeps being repeated for each of the $2^n$ regions.

7. A method as claimed in claim 1 in which said second step comprises the substeps of:

discriminating whether or not a subject subregion exists in the $2^n$ subregions;

setting a leaf flag when the subject subregion is made up solely single kind of region;

adding a specific filial node to the node in the first level of said tree structure corresponding to the subject subregion when the subject subregion is made up of two or more kinds of regions; and setting a pointer of said specific filial node to a parent node thereof, said substeps being repeated for each of the $2^n$ subregions.

8. A method as claimed in claim 7 which further comprises the substeps of:

adding a leaf to a specific leaf corresponding to the subject subregion set with said leaf flag by integrating one of $2^n - 1$ pattern codes thereto when said substeps are repeated for each of the $2^n$ subregions; and setting a pointer of said specific leaf to the parent node thereof.

9. A method of describing an image made up of a plurality of kinds of regions in an n-dimensional space by a tree structure, said method comprising:

a first step of recursively and equally dividing said image in the n-dimensional space into $2^n$ regions until each of the $2^n$ regions include two or less kinds of regions, thereby making a first level of said tree having a root node corresponding to said image in its entirety, L nodes connected to said root node and each corresponding to a region with three or more kinds of regions and M leaves connected to said root node or a node and each corresponding to a region with two or less kinds of regions, where $L=0, 1, 2, \ldots, n$, $M=1, 2, 3, \ldots, n$ and $L+M=n$, each of said nodes having branches branching out therefrom and connecting to a filial node or leaf thereof;

a second step of recursively and equally subdividing each of said $2^n$ regions in the n-dimensional space into $2^n$ subregions until each subregion includes only one kind of region and for describing only one of two kinds of regions by a tree structure in which each node which degree is one and only having one branch is integrated into a filial node or leaf thereof, thereby making a second level of said tree structure, each node in the second level of said tree structure being added with first division information described by sequential data of $2^n$ kinds of codes corresponding to position information of each node with respect to a parent node thereof, each leaf in the second level of said tree structure being added with second division information, said second division information describing at least a least significant code of said first division information by $2^n$ or more kinds of codes which are pattern information of each leaf with respect to a parent node thereof; and a third step of making a restructuring of the tree at the nodes of each branch to rearrange the node in order so that a node having a largest number of leaves connected thereto is arranged on one side of the tree and a number of leaves connected to the node decreases toward the other side of the tree; said tree structure describing said image in the first and second levels thereof.

10. A method of describing an image made up of two kinds of regions in an n-dimensional space by a tree structure, said method comprising the steps of:

recursively and equally dividing said image in the n-dimensional space into $2^n$ regions until each region includes only one kind of region and for describing only one of two kinds of regions by a tree structure having a root node corresponding to said image in its entirety, L nodes connected to said root node and each corresponding to a region with two kinds of regions and M leaves connected to said root node or a node and each corresponding to a region with one kind of region, where $L=0, 1, 2, \ldots, n$, $M=1, 2, 3, \ldots, n$ and $L+M=n$, each of said nodes having branches branching out therefrom and connecting to a filial node or leaf thereof;

integrating out of said nodes a node which degree is one only having one branch into a filial node thereof; and adding to each of said nodes and leaves division information described by sequential data of $2^n$ kinds of codes corresponding to position information with respect to a parent node thereof.

11. A method of describing an image made up of two kinds of regions in an n-dimensional space by a tree structure, said method comprising the steps of:

recursively and equally dividing said image in the n-dimensional space into $2^n$ regions until each region includes only one kind of region and for describing only one of the two kinds of regions by a tree structure having a root node corresponding to said image in its entirety, L nodes connected to said root node and each corresponding to a region with two kinds of regions and M leaves connected to said root node or a node and each corresponding to a region with one kind of region, where $L=0, 1, 2, \ldots, n$, $M=1, 2, 3, \ldots, n$ and $L+M=n$, each of said nodes having branches branching out therefrom and connecting to a filial node or leaf thereof;

integrating out of said nodes a node which degree is one and only having one branch into a filial node thereof;

adding to each of said nodes and leaves division information described by sequential data of $2^n$ kinds of codes corresponding to position information with respect to a parent node thereof; and making a restructuring of the tree at the nodes of each branch to rearrange the node in order so that a node having a largest number of leaves connected thereto is arranged on one side of the tree and a number of leaves connected to the node decreases toward the other side of the tree.

12. A method of describing an image made up of two kinds of regions in an n-dimensional space by a tree structure, said image information control system comprising the steps of:

recursively and equally dividing said image in the n-dimensional space into $2^n$ regions until each region includes only one kind of region and for describing only one of the two kinds of regions by a tree structure having a root node corresponding to said image in its entirety, L nodes connected to said root node and each corresponding to a region with two kinds of regions and M leaves connected to said root node or a node and each corresponding to a region with one kind of region, where $L=0, 1, 2, \ldots, n$, $M=1, 2, 3, \ldots, n$ and $L+M=n$, each of said nodes having branches branching out therefrom and connecting to a filial node or leaf thereof;

integration out of said nodes a node which degree is one and only having one branch into a filial node thereof;

adding to each node which degree is one and remaining leaves first division information described by sequential data of $2^n$ kinds of codes corresponding to position information with respect to a parent node thereof; and adding to each of said leaves second division information corresponding to a least significant code of said first division information and described by $2^n$ or more kinds of codes which are pattern information with respect to a parent node thereof so as to integrate leaves connected to a common parent node.

13. A method of describing an image made up of two kinds of regions in an n-dimensional space by a tree structure, said method comprising the steps of:

recursively and equally dividing said image in the n-dimensional space into $2^n$ regions until each region includes only one kind of region and for describing only one of the two kinds of regions by a tree structure having a root node corresponding to said image in its entirety, L nodes connected to said root node and each corresponding to a region with two kinds of regions and M leaves connected to said root node or a node and each corresponding to a region with one kind of region, where $L=0, 1, 2, \ldots, n$, $M=1, 2, 3, \ldots, n$ and $L+M=n$, each of said nodes having branches branching out therefrom and connecting to a filial node or leaf thereof;

integrating out of said nodes a node which degree is one and only having one branch into a filial node thereof;

adding to each node which degree is one and remaining leaves first division information described by sequential data of $2^n$ kinds of codes corresponding to position information with respect to a parent node thereof;

adding to each of said leaves second division information corresponding to a least significant code of said first division information and described by $2^n$ or more kinds of codes which are pattern information with respect to a parent node thereof so as to integrate leaves connected to a common parent node; and making a restructuring of the tree at the nodes of each branch to rearrange the node in order so that a node having a largest number of leaves connected thereto is arranged on one side of the tree and a number of leaves connected to the node decreases toward the other side of the tree.

14. A method of describing an image including point information in an n-dimensional space by a tree structure, said method comprising the steps of:

recursively and equally dividing said image in the n-dimensional space into $2^n$ regions until each region includes a maximum of one point information and for describing only those regions including point information by a tree structure having a root node corresponding to said image in its entirety, L nodes connected to said root node and each corresponding to a region with two kinds of regions and M leaves connected to said root node or a node and each corresponding to a region with one kind of region, where $L=0, 1, 2, \ldots, n$, $M=1, 2, 3, \ldots,$ n and $+M=n$, each of said nodes having branches branching out therefrom and connecting to a filial node or leaf thereof;

integrating a node which degree is one and only having one branch into a filial node thereof; and adding to each of said nodes and leaves division information described by sequential data of $2^n$ kinds of codes corresponding to position information with respect to a parent node thereof.

15. A method of describing an image including point information in an n-dimensional space by a tree structure, said method comprising the steps of:

recursively and equally dividing said image in the n-dimensional space into $2^n$ regions until each region includes a maximum of one point information and for describing only those regions including point information by a tree structure having a root node corresponding to said image in its entirety, L nodes connected to said root node and each corresponding to a region with two kinds of regions and M leaves connected to said root node or a node each corresponding to a region with one kind of region where $L=0, 1, 2, \ldots, n$, $M=1, 2, 3, \ldots, n$ and $L+M=n$, each of said nodes having branches branching out therefrom and connecting to a filial node of leaf thereof;

integrating a node which degree is one and only having one branch into a filial node thereof;

adding to each of said nodes and leaves division information described by sequential data of 2kinds of codes corresponding to position information with respect to a parent node thereof; and making a restructuring of the tree at the nodes of each branch to rearrange the nodes in order so that a node having a largest number of leaves connected thereto is arranged on one side of the tree and number of leaves connected to the node decreases toward the other side of the tree.

16. A method of describing an image including point information in an n-dimensional space by a tree structure, said method comprising the steps of:

recursively and equally dividing said image in the n-dimensional space into $2^n$ regions until each region includes a maximum of one point information and for describing only those regions including point information by a tree structure having a root node corresponding to said image in its entirety, L nodes connected to said root node and each corresponding to a region with two kinds of regions and M leaves connected to said root node or a node each corresponding to a region with one kind of region, where $L=0, 1, 2, \ldots ,n$, $M=1, 2, 3,$ n and $L+M=n$, each of said nodes having branches branching out therefrom and connecting to a filial node of leaf thereof;

integrating a node which degree is one and only having one branch into a filial node thereof;

adding to each of said nodes and leaves division information described by sequential data of $2^n$ kinds of codes corresponding to position information with respect to a parent node thereof; and converting input data into said division information to retrieve a point by pattern matching with the division information of each of said nodes.

* * * * *